United States Patent [19]
Bane

[11] Patent Number: 5,684,472
[45] Date of Patent: Nov. 4, 1997

[54] METHOD AND APPARATUS FOR REMOTELY ACCESSING METER STATUS INFORMATION IN A METER READING SYSTEM

[75] Inventor: Ronald L. Bane, Stone Mountain, Ga.

[73] Assignee: Motorola, Inc., Schaumburg, Ill.

[21] Appl. No.: 646,573

[22] Filed: May 8, 1996

[51] Int. Cl.[6] .......................... G08B 23/00; G08C 15/06
[52] U.S. Cl. .................. 340/870.02; 340/310.06; 340/825.54; 340/870.03; 370/311; 370/465; 455/54.1; 455/343
[58] Field of Search ............... 340/310.06, 870.02, 340/825.54, 870.3, 870.03; 375/222; 455/3.3, 73, 54.1, 343; 370/311, 465

[56] References Cited

U.S. PATENT DOCUMENTS

| | | | |
|---|---|---|---|
| 4,254,472 | 3/1981 | Juengel et al. | 364/900 |
| 4,322,842 | 3/1982 | Martinez | 370/11 |
| 4,450,481 | 5/1984 | Dickinson | 358/114 |
| 4,586,189 | 4/1986 | Tyrrell | 375/117 |
| 4,737,967 | 4/1988 | Cahalan | 375/9 |
| 4,763,104 | 8/1988 | Inoue et al. | 340/310.06 |
| 4,783,748 | 11/1988 | Swarztrauber et al. | 340/870.02 |
| 4,868,893 | 9/1989 | Hammond | 340/870.02 |
| 5,185,591 | 2/1993 | Shuey | 340/310.06 |
| 5,381,133 | 1/1995 | Erhart | 340/825.44 |
| 5,400,330 | 3/1995 | Le Van Suu | 370/465 |
| 5,481,259 | 1/1996 | Bane | 340/870.03 |
| 5,493,287 | 2/1996 | Bane | 340/825.52 |

Primary Examiner—Jeffery Hofsass
Assistant Examiner—Timothy Edwards, Jr.
Attorney, Agent, or Firm—Kenneth M. Massaroni; Kelly A. Gardner

[57] ABSTRACT

A meter reading system (10) for reading meter status information from meters (150) includes a meter reading device (15) for transmitting messages at a first data rate, i.e., a higher data rate, and at a second data rate, i.e., a lower data rate. Externally powered meter interface units (14) receive at least the messages transmitted at the higher data rate, and battery powered meter interface units (12) only receive the messages transmitted at the lower data rate.

21 Claims, 4 Drawing Sheets

METHOD AND APPARATUS FOR REMOTELY ACCESSING METER STATUS INFORMATION IN A METER READING SYSTEM

TECHNICAL FIELD

This invention relates in general to meter reading systems, and more specifically to a method and apparatus for remotely accessing meter status information in a meter reading system.

BACKGROUND OF THE INVENTION

Utility companies have started taking advantage of modern technology to reduce costs and increase efficiency in meter reading applications. Traditionally, meters, such as electric, gas, and water meters, have been manually read by a person physically reading each meter. However, recent developments have provided for meters which can be remotely accessed from a central location through wire or wireless communication links. Typically, meter interface units are coupled to meters that are to be read. The meter interface units gather meter status information for subsequent transmission to one or more remote meter reading devices.

Some meter interface units, such as those coupled to electric meters, are usually powered by external power sources. Other meter interface units, such as those coupled to gas and water meters, are battery powered, so power consumption is an important issue. Typically, all of the meter interface units are polled for meter status information. Both the externally powered meter interface units and the battery powered meter interface units periodically check the communication channel for activity and extend receiver on-time when activity is found. The battery life of battery powered meter interface units is therefore dependent on the channel activity within range of the units.

In fixed networks, where the externally powered units coexist with the battery powered units, the channel activity can be very high because the externally powered units, which are typically coupled to electric meters, tend to require load surveys and more frequent meter status checks. Unless channel activity is severely limited, this results in a significantly shortened battery life for the battery powered meter interface units.

Thus, what is needed is a method and apparatus for remotely accessing meter status information while maximizing the battery life for battery powered meter interface units.

DETAILED DESCRIPTION OF THE PREFERRED EMBODIMENT

Figure 1:
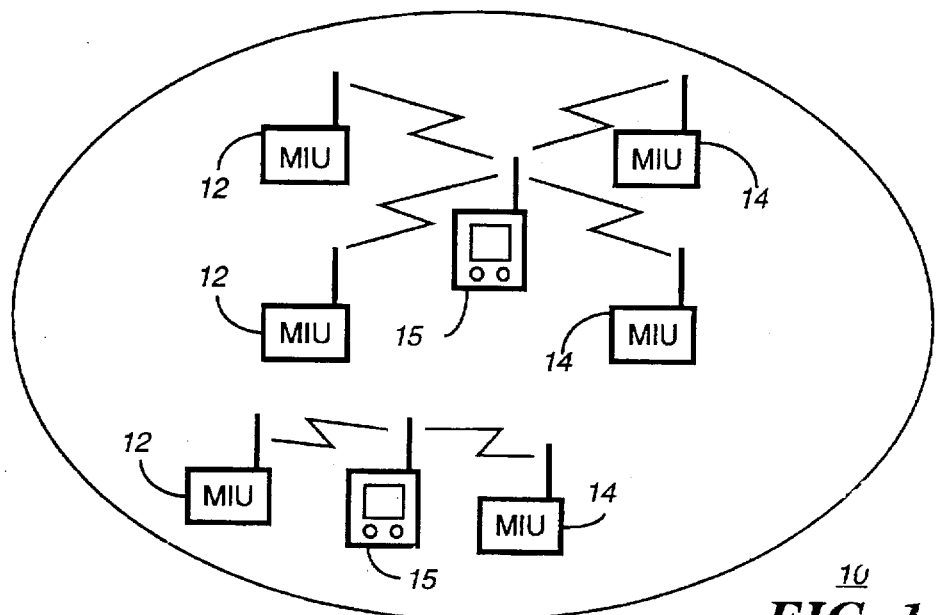
FIG. 1 illustrates a meter reading system including a meter reading device, externally powered meter interface units, and battery powered meter interface units in accordance with the present invention.

While the specification concludes with claims defining the features of the invention that are regarded as novel, it is believed that the invention will be better understood from a consideration of the following description in conjunction with the drawing figures, in which like reference numerals are carried forward.

FIG. 1 is an illustration of a communication system, such as a remote meter reading system 10, in accordance with the present invention. The communication system 10 includes one or more remote transmitting devices, which preferably comprise meter reading devices 15, or master units. The meter reading devices 15 can be hand-held, mobile, or fixed in location. The system 10 also comprises a group of remotely located receiving devices for receiving signals from meter reading devices 15. Preferably, the receiving devices comprise meter interface units (MIUs) coupled to meters, e.g., water, gas, and electric meters, for gathering meter status information therefrom and transmitting the information to one or more of the meter reading devices 15. The system 10 includes both battery powered MIUs 12, such as those coupled to gas and water meters, and externally powered MIUs 14, such as those coupled to electric meters, and the meter reading devices 15 according to the present invention can both transmit and receive messages from the MIUs 12, 14.

In the meter reading system 10, the remote MIUs 12, 14 have a power consumption management system which allows each MIU 12, 14 to operate in a reduced power consumption mode. The remote units 12, 14 achieve power consumption savings by alternating between active and inactive states. While in an inactive state, there is no communication capability. However, the MIUs 12, 14 are periodically activated to enable communications with the meter reading device 15. During such periods, the MIUs 12, 14 are responsive to communication signals initiated by the remote meter reading device 15. According to the present invention, communications between the battery powered MIUs 12 and the meter reading device 15 occur at a first data rate, while communications between the externally powered MIUs 14 and the meter reading device 15 occur at a second data rate different than the first data rate. Preferably, the first and second data rates are not integer multiples of each other. Also, the data rate associated with battery powered MIUs 12 is preferably lower than the data rate associated with externally powered MIUs 14.

In prior art meter reading systems, all communications between a meter reading device and MIUs occur at the same data rate regardless of the power source of the MIUs. All MIUs periodically check the communication channel for activity, i.e., for data at the one predetermined data rate, and extend receiver on-time when data is detected at the correct data rate. However, some MIUs, such as those coupled to electric meters, must be polled for meter status information fairly often. These frequently occurring communications cause all MIUs to extend receiver on-time. As a result, the battery life of battery powered MIUs can be significantly decreased. Therefore, either the batteries powering the MIUs must be changed often, resulting in increased expense and expenditure of time, or the channel activity must be severely limited, resulting in insufficient gathering of meter status information.

In the system 10 according to the present invention, on the other hand, communications between battery powered MIUs 12 and externally powered MIUs 14 occur at different data rates so that more frequent communication with externally powered MIUs 14 does not result in extended receiver on-time for the battery powered MIUs 12. Therefore, meter status information associated with electric meters, which tend to require more load surveys and "reads", can be gathered and transmitted more often than meter status information associated with other types of meters, such as gas and water meters that are coupled to battery powered MIUs 12. Furthermore, the electric meters can be read more often without decreasing the battery life of the battery powered MIUs 12, which do not detect the communications directed to the externally powered MIUs 14 at the first data rate. Instead, the battery powered MIUs 12 preferably detect only the second data rate. Hereinafter, the data rate received by only the externally powered MIUs 14 will be referred to as the higher data rate, and the data rate received by at least the battery powered MIUs 12 will be referred to as the lower data rate.

As mentioned above, only the externally powered MIUs 14 detect the higher data rate. Additionally, in some embodiments of the present invention, the MIUs 14 can also detect the lower data rate. In this manner, the externally powered MIUs 14 can receive messages that are transmitted by the meter reading device 15 at both the higher and lower data rates.

Figure 2:
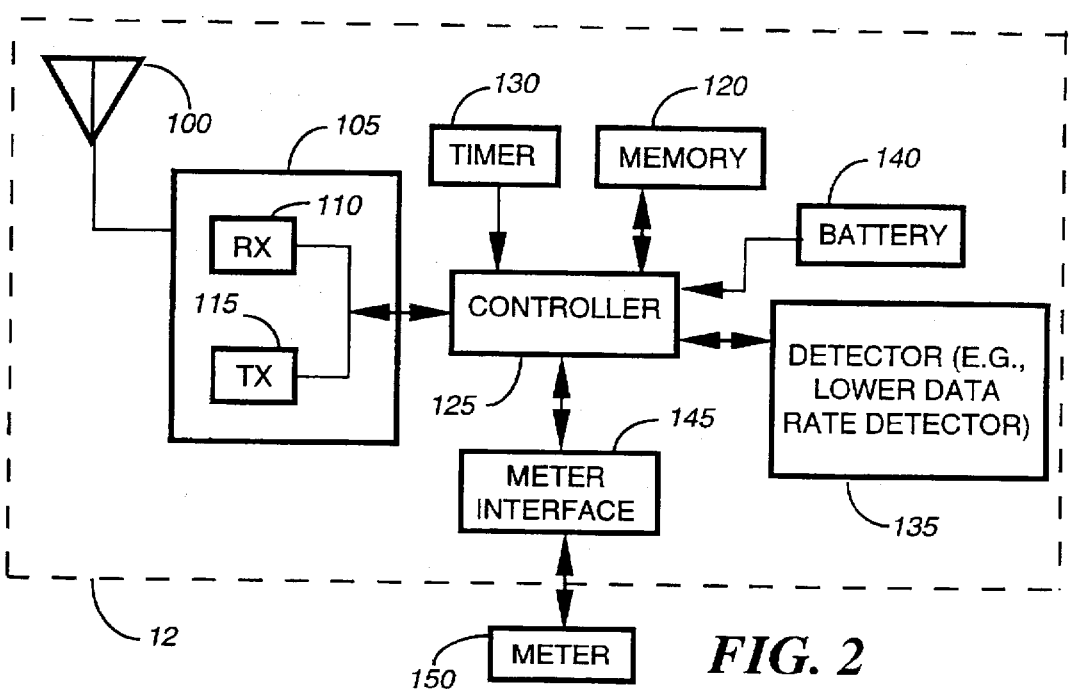
FIG. 2 is an electrical block diagram of a battery powered meter interface unit of FIG. 1 in accordance with the present invention.

FIG. 2 is an electrical block diagram of a battery powered MIU 12, which is coupled to a meter 150, such as a gas or water meter, for reading the meter status information therefrom. Additionally, the MIU 12 provides remote access to the functions of the meter 150. The MIU 12 includes an antenna 100 for transmitting and receiving a radio frequency signal. A receiver 110 included in a transmit/receive circuit 105 demodulates an incoming signal, while a transmitter 115 modulates signals to be transmitted. A controller 125 coupled to the transmit/receive circuit 105 processes incoming signals to recover messages therefrom and processes meter status information to format it into a conventional signaling protocol for transmission to the meter reading device 15. Portions of the MIU 12, such as the transmit/receive circuit 105, the meter interface 145, and the controller 125, are enabled and disabled in a conventional manner for battery saving. Specifically, in response to timer signals, the MIU 12 periodically wakes to receive a signal and attempt to detect the lower data rate. When the lower data rate is detected, the receiver 110 continues to be enabled for further reception. When the lower data rate is not detected, the receiver 110 is disabled until a further time.

The MIU 12 further includes a meter interface 145 for coupling to the meter 150, a battery 140 for powering the MIU 12, a timer 130 for providing time information by which the MIU 12 enters and exits battery saving mode, and a data rate detector 135, such as a lower data rate detector, for detecting the lower data rate in a manner well known to one of ordinary skill in the art. A memory 120 stores logic used to control the operation of the MIU 12. The memory 120 stores, for instance, gathered meter status information as well as a number of total edges, a number of good edges, and a time out value used by the lower data rate detector 135 in determining whether the received signal is at the lower data rate.

The lower data rate detector 135 monitors the edges, i.e., the transitions, of the data generated by the receiver 110. The detector 135 counts the number of good edges and the number of total edges and, when a predetermined number of good edges occur within a time given by a programmed time out value, determines that the signal is transmitted at the lower data rate. Otherwise, a time out signal is provided to the controller 125 to indicate that the lower data rate has not been detected.

When the lower data rate is detected, messages included in the signal are recovered by the controller 125 in a conventional manner. These messages can include specific commands which require a response from the MIU 12. Conventional commands include wake-up requests or activation signals, meter reading requests, and programming information. The MIU 12 responds to a wake-up request by operating in an activated state for an extended time period. Upon receiving programming information, the information is stored in the memory 120. In response to a meter reading request, the MIU 12 communicates with the meter 150 via the meter interface 145 to extract meter status information. The MIU 120 responds to meter reading requests by formatting the meter status information for transmission to the meter reading device 15, preferably at the lower data rate.

According to the present invention, the data rate detector 135, the controller 125, the timer 130, and the memory 120 can be embodied in firmware that is executed by a microprocessor. Alternatively, some or all of the recited elements could be implemented in hardware capable of performing equivalent operations. It will also be recognized that, in a hardware embodiment, the detector 135 could be coupled directly to the transmit/receive circuit 105.

Figure 3:
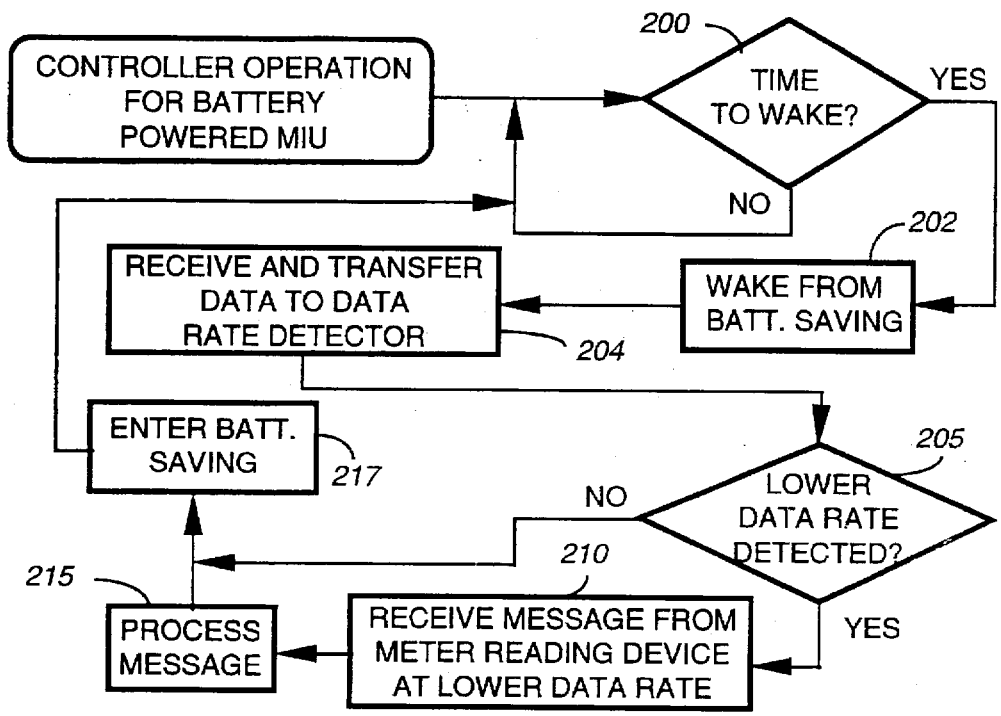
FIG. 3 is a flowchart of an operation of a controller included in the battery powered meter interface unit of FIG. 2 in accordance with the present invention.

FIG. 3 is a flowchart of an operation of the controller 125 included in the battery powered MIU 12. At step 200, the controller 125 monitors time information provided by the timer 130 to determine whether it is time to wake from battery saving. When so, the controller 125 re-enables, at step 202, portions of the MIU 12 that have been in battery saving mode for reception of a radio signal. The controller 125 then, at step 204, receives and transfers data to the lower data rate detector 135. When, at step 205, the lower data rate is not detected, portions of the MIU 12, such as the transmit/receive circuit 105, the controller 125, and the meter interface 145, enter battery saving mode, at step 217. When the lower data rate is detected, a message is recovered, at step 210, from the signal and processed, at step 215, by the controller 125, after which battery saving mode is resumed, at step 217.

Figure 4:
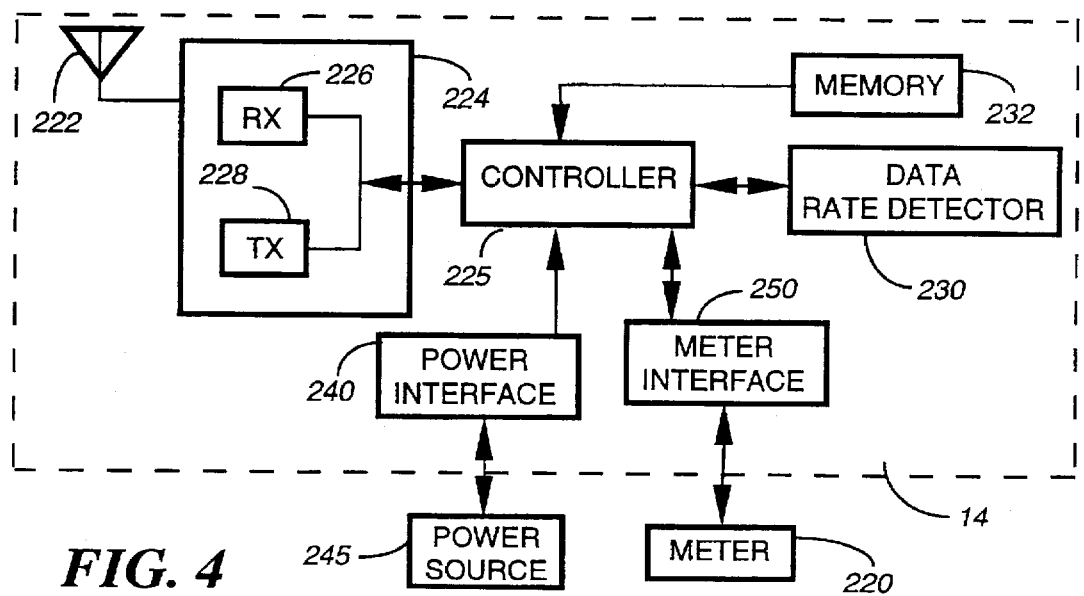
FIG. 4 is an electrical block diagram of an externally powered meter interface unit of FIG. 1 in accordance with the present invention.

FIG. 4 is an electrical block diagram of an externally powered MIU 14, such as one coupled to an electric meter 220 that needs to be read relatively often. The externally powered MIU 14, like the battery powered MIU 12 (FIG. 2), includes an antenna 222, a transmit/receive circuit 224 comprising a receiver 226 and a transmitter 228, a memory 232, and a controller 225 for controlling operations of the MIU 14. Additionally, the MIU 14 includes a power interface 240 for coupling to an external power source 245, such as a conventional electrical outlet. A meter interface 250 couples to a meter, such as electric meter 220.

According to a preferred embodiment of the present invention, the MIU 14 also includes a data rate detector 230 for detecting signals transmitted at both the lower and higher data rates to recover messages transmitted at both data rates. For instance, this can be done by establishing, for the lower data rate signal, a unique preamble that can be recognized by the detector 230 even when the detector 230 is searching for the higher data rate. After determining from the preamble that the lower data rate is being transmitted, the data rate detector 230 could be switched to sample the data at the lower data rate for reception of the lower data rate message.

By way of example, the lower data rate could be 2,000 baud, while the higher data rate could be 2,400 baud. Signals transmitted at each data rate preferably include different preambles so that the lower data rate devices, i.e., the battery powered MIUs 12, do not detect the higher data rate. The preamble of a 2,000 baud signal could comprise, for instance, alternating sets of five bit sequences. Specifically, preamble for 2,000 baud could comprise five "ones", followed by five "zeros", followed by five "ones", etc. The higher data rate preamble could simply comprise an alternating pattern of "ones" and "zeros". In this manner, the battery powered MIUs 12 searching for the lower data rate would be unable to detect the higher data rate. However, since the five-bit period at 2,000 baud is equal to six bits at 2,400 baud, the externally powered MIUs 14 could detect preambles of both the lower and higher data rates. One of ordinary skill will recognize that when it is unimportant for the MIUs 14 to detect both rates, the lower data rate preamble need not have transitions that are common for both data rates.

Figure 5:
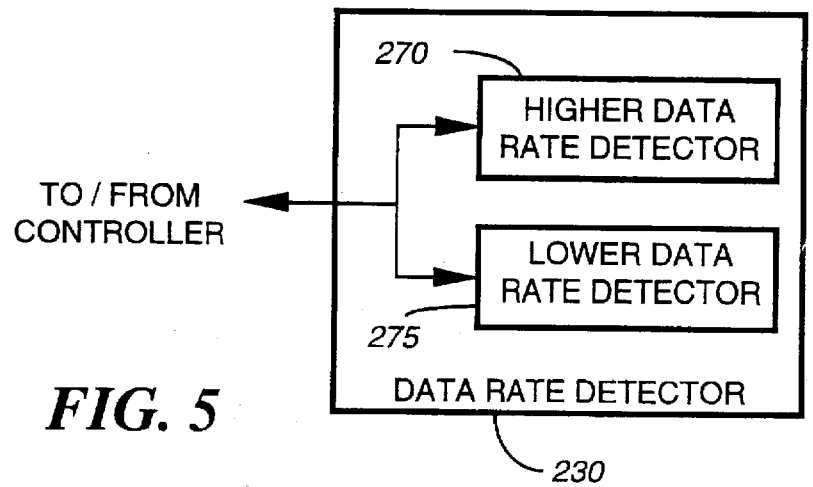
FIG. 5 is an electrical block diagram of a data rate detector that can be included in the externally powered meter interface unit of FIG. 1 in accordance with the present invention.

FIG. 5 is an electrical block diagram of a data rate detector 230 that can be utilized when it is desired that the externally powered MIU 14 recognize both the lower and higher data rates even when the lower data rate preamble has transitions that are not common to both data rates. According to this alternate embodiment of the present invention, the detector 230 comprises both a first data rate detector, i.e., a lower data rate detector 275, and a second data rate detector, i.e., a higher data rate detector 270. Both the lower data rate detector 275 and the higher data rate detector 270 can operate independently to respectively search for lower data rate and higher data rate preambles at the same time. When one of the data rates is detected, the incoming signal can then be provided to only the appropriate data rate detector for message reception.

Figure 6:
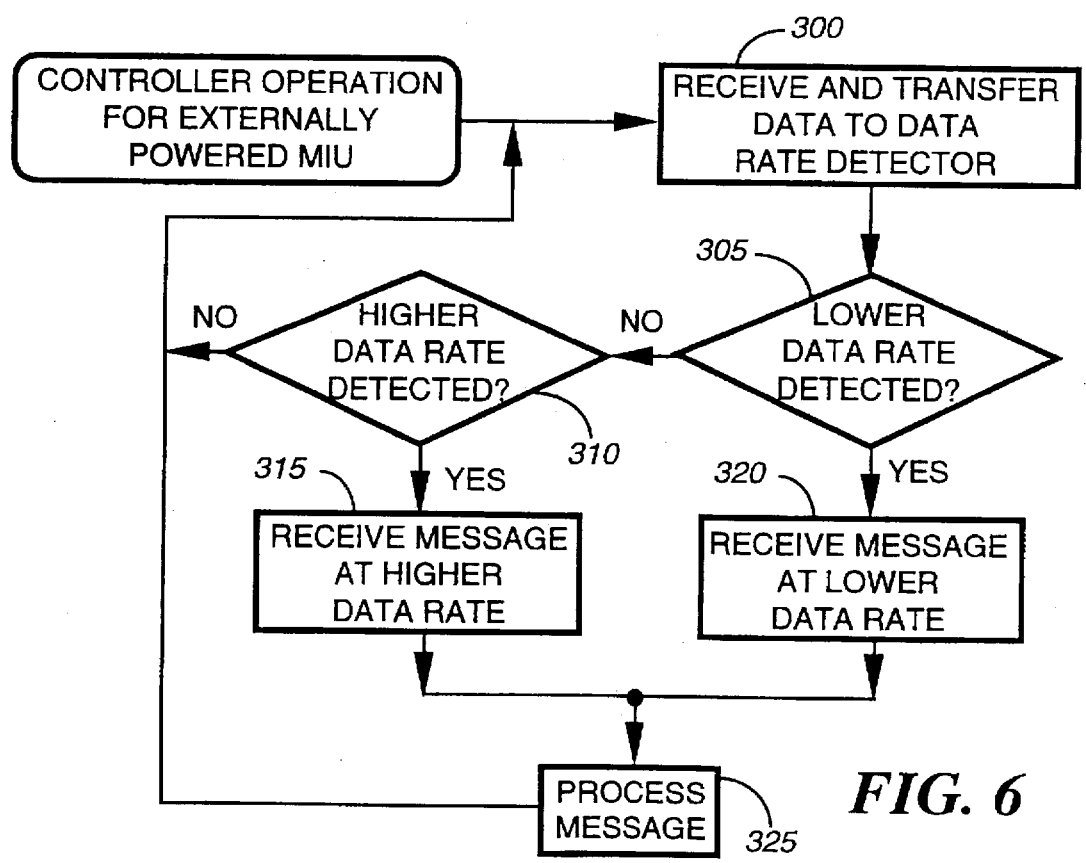
FIG. 6 is a flowchart of an operation of a controller included in the externally powered meter interface unit of FIG. 4 in accordance with the present invention.

Referring next to FIG. 6, a flowchart depicts an operation of the controller 225 included in the externally powered MIU 14. At step 300, the controller 225 receives incoming data and transfers the data to the data rate detector 230. As mentioned above, the data rate detector 230 according to the preferred embodiment of the present invention normally searches for the higher data rate, but is also capable of recognizing the preamble of the lower data rate signal. When, at step 305, the lower data rate is detected, messages are received, at step 320, at the lower data rate after switching the detector 230 to sample the signal at the lower data rate. When, at step 310, the higher data rate is detected, messages are received, at step 315, at the higher data rate. The received messages are then processed, at step 325.

According to the present invention, both the battery powered MIUs 12 and the externally powered MIU 14 check the communication channel for activity before transmitting to avoid situations in which communication interference, or collisions, could result. When the lower and higher data rates are 2,000 baud and 2,400 baud, respectively, the externally powered MIUs 14 can detect channel activity at either baud rate. Additionally, battery powered MIUs 12 can be programmed to search for both data rates prior to transmitting. Preferably, the transmit data rate for each MIUs 12, 14 is the same as its receive data rate. Transmit and receive data rates can be programmed into the memory of each MIU 12, 14.

Figure 7:
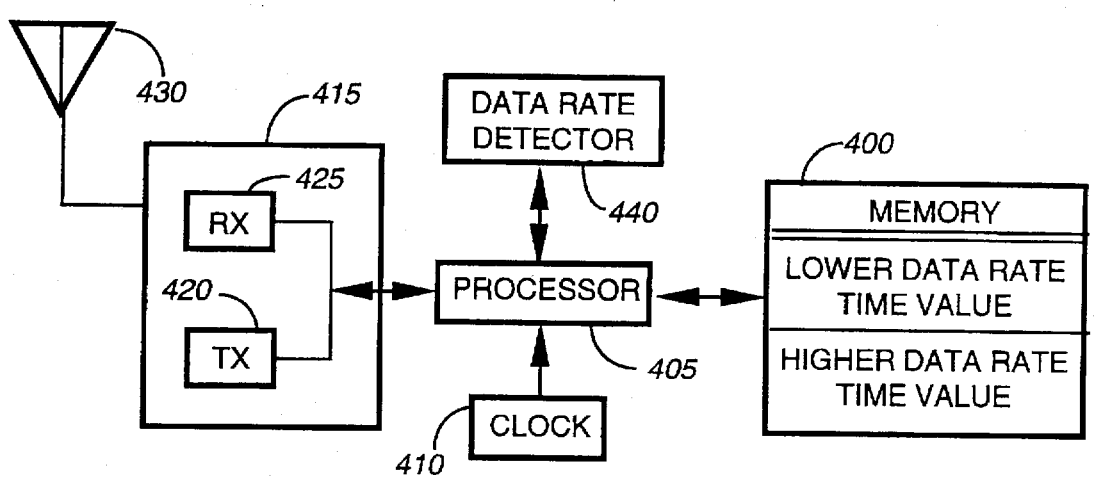
FIG. 7 is an electrical block diagram of the meter reading device of FIG. 1 in accordance with the present invention.

FIG. 7 is an electrical block diagram of a meter reading device 15 included in the meter reading system 10 (FIG. 1).

The meter reading device 15 has communications capability similar to that described with respect to the MIUs 12, 14. Accordingly, the meter reading device 15 has a processor 405 for controlling device operations, a clock 410 for providing time information, and a memory 400 for storing logic. A transmit/receive circuit 415 includes a receiver 425 and a transmitter 420 for providing two-way communications through an antenna 430. The memory 400 stores data that facilitates the operation of the meter reading device 15. For instance, the memory 400 can store addresses of the MIUs 12, 14 as well as time values indicative of times at which communications are initiated at the lower and higher data rates. A data rate detector 440 detects communications at both the lower and higher data rates. Such communications can, for instance, comprise transmissions from MIUs 12, 14 or other meter reading devices 15 in the system 10.

The meter reading device 15 is capable of initiating communications with the remotely situated MIUs 12, 14 over one or more communication channels or radio frequencies at the lower and higher data rates. The meter reading device 15 initiates communications by transmitting a wake-up request addressed to one or more target MIUs 12, 14. The meter reading device 15 then waits to receive a message containing meter status information from the MIU 12, 14. Additionally, unsolicited meter status information can also be received from MIUs 12, 14. The meter status information is preferably stored in the memory 400.

Figure 8:
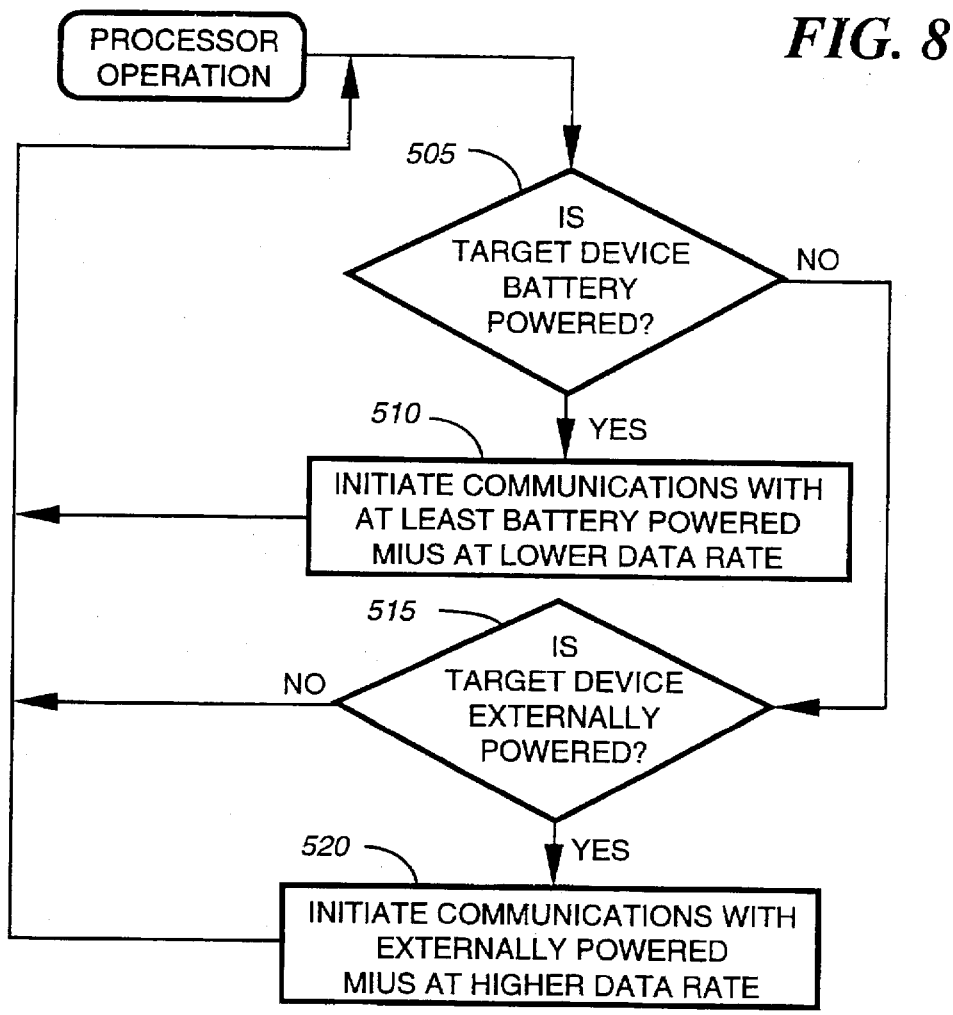
FIG. 8 is a flowchart depicting an operation of a processor included in the meter reading device of FIG. 7 in accordance with the present invention.

Referring to FIG. 8, a flowchart shows an operation of the processor 405 of the meter reading device 15. As mentioned earlier, the MIUs 12, 14 typically operate in reduced power consumption mode, and a remote meter reading session begins when communications are initiated by the meter reading device 15. When, at step 505, the target device is a battery powered MIU 12, communications are initiated, at step 510, with one or more battery powered MIUs 12 by transmitting a wake-up request at the lower data rate. When, at step 515, the target device is an externally powered MIU 14, communications are initiated with one or more externally powered MIUs 14 by transmitting, at step 520, a meter reading request at the higher data rate.

By way of example, in a fixed communication system, the processor 405 could determine the type of target device by monitoring the clock 410 to determine whether times for communicating with battery powered MIUs 12 or externally powered MIUs 14 have arrived. Alternatively, the type of target device could be determined by reference to a signal received via controls (not shown) coupled to the processor 405 (FIG. 7). When, for instance, the meter reading device 15 is hand-held, an operator could follow a set route and key in MIU types as each individual MIU is to be read.

Although not shown in FIG. 8, the meter reading device 15 preferably checks for channel activity at both the lower and higher data rates prior to initiating communications with the MIUs 12, 14. When channel activity resulting from communications between a different meter reading device 15 and other MIUs 12, 14 is detected, the meter reading device 15 waits to transmit until the other communications are completed. In this manner, the likelihood of communication interference is conveniently minimized.

In summary, the communication system as described above includes both battery powered and externally powered receiving devices for gathering information for transmission to a remote communication device. For example purposes only, the communication system is described as a remote meter reading system for reading meter status information of meters, such as electrical, gas, and water meters. In the example meter reading system, the meter status information is gathered by externally powered and battery powered meter interface units (MIUs) then subsequently transmitted in response to messages provided by a meter reading device within communication range of the MIUs.

The externally powered MIUs, which are preferably coupled to electric meters, must receive communications from the meter reading device relatively often, thereby using a significant amount of power. Therefore, the communications between the externally powered MIUs and the meter reading device occur at a data rate that cannot be detected by the battery powered MIUs. In this manner, the battery powered MIUs do not unnecessarily waste battery power by receiving communications intended for reception only by the externally powered MIUs. The battery powered MIUs advantageously conserve power by only detecting a different data rate, which is preferably lower than that used to communicate with externally powered MIUs. Communications with the battery powered MIUs at the lower data rate occur less frequently, such as once a day, so that battery life can be conveniently extended.

It will be appreciated by now that there has been provided a method and apparatus for remotely accessing meter status information while maximizing the battery life for battery powered meter interface units.

What is claimed is:

1. A communication system for reading information, comprising:
   a transmitting device for transmitting messages at a first data rate and messages at a second data rate;
   externally powered receiving devices for receiving at least the messages transmitted at the first data rate; and
   battery powered receiving devices for receiving only the messages transmitted at the second data rate.

2. The communication system of claim 1, wherein:
   the communication system comprises a meter reading system;
   the information comprises meter status information read from meters;
   the transmitting device comprises a meter reading device; and
   the externally powered receiving devices and the battery powered receiving devices comprise externally powered meter interface units and battery powered meter interface units, respectively.

3. The communication system of claim 2, wherein the meter reading device comprises:
   a transmitter for transmitting, at the second data rate, a preamble that can be recognized by both the battery powered meter interface units and the externally powered meter interface units.

4. The communication system of claim 2, wherein the meter reading device further comprises:
   a data rate detector for detecting channel activity at the first and second data rates; and
   a transmitter coupled to the data rate detector for transmitting the messages when there is no channel activity at either of the first and second data rates.

5. The communication system of claim 2, wherein the battery powered meter interface units comprise:
   a receiver for receiving a signal;
   a data rate detector coupled to the receiver for determining whether the signal is transmitted at the second data rate; and
   a controller coupled to the data rate detector for recovering the messages from the signal only when the signal is transmitted at the second data rate.

6. The communication system of claim 5, wherein the battery powered meter interface units further comprise:
   a battery coupled to the controller for providing power thereto; and
   a meter interface coupled to a meter and the controller for gathering the meter status information for subsequent transmission to the meter reading device.

7. The communication system of claim 2, wherein the externally powered meter interface units comprise:
   a receiver for receiving a signal;
   a data rate detector coupled to the receiver for determining whether the signal is transmitted at the first data rate; and
   a controller coupled to the data rate detector for recovering the messages from the signal when the signal is transmitted at the first data rate.

8. The communication system of claim 7, wherein the externally powered meter interface units further comprise:
   a meter interface coupled to a meter for gathering the meter status information for subsequent transmission to the meter reading device; and
   a power interface coupled to an external power source for receiving power therefrom.

9. The communication system of claim 7, wherein the externally powered meter interface units further comprise:
   detecting means for detecting whether the signal is transmitted at the second data rate.

10. A method for remotely accessing meter status information in a meter reading system comprising a meter reading device, battery powered meter interface units, and externally powered meter interface units, the method comprising the steps of:
    the meter reading device transmitting messages at a first data rate and at a second data rate;
    the externally powered meter interface units detecting at least the first data rate and receiving at least the messages transmitted at the first data rate in response to detecting the first data rate; and
    the battery powered meter interface units detecting only the second data rate, and not the first data rate, and receiving only the messages transmitted at the second data rate in response to detecting the second data rate.

11. The method of claim 10, further comprising the step of:
    the externally powered meter interface units detecting the second data rate as well as the first data rate and receiving the messages at the first and second data rates.

12. The method of claim 10, further comprising, in the meter reading device, the steps of:
    receiving, prior to transmitting the messages, a signal;
    determining whether the signal is transmitted at any of the first and second data rates;
    not transmitting the messages at the first data rate when the signal is transmitted at the first data rate; and
    not transmitting the messages at the second data rate when the signal is transmitted at the second data rate.

13. The method of claim 10, wherein the step of transmitting the messages comprises, in the meter reading device, the steps of:
    transmitting the messages at the first data rate only when there is no channel activity at the first data rate; and
    transmitting the messages at the second data rate only when there is no channel activity at the second data rate.

14. The method of claim 10, further comprising, in the externally powered meter interface units, the steps of:
   receiving a signal;
   determining whether the signal is transmitted at the first data rate; and
   recovering the messages from the signal in response to determining that the signal is transmitted at the first data rate.

15. The method of claim 14, further comprising, in the externally powered meter interface units, the steps of:
   determining whether the signal is transmitted at the second data rate;
   recovering the messages from the signal in response to determining that the signal is transmitted at the second data rate; and
   processing the messages.

16. The method of claim 10, further comprising, in the battery powered meter interface units, the steps of:
   receiving a signal;
   determining whether the signal is transmitted at the second data rate; and
   recovering the messages from the signal in response to determining that the signal is transmitted at the second data rate.

17. The method of claim 16, further comprising, in the battery powered meter interface units, the steps of:
   determining that the signal is not transmitted at the second data rate, in response to which the messages are not recovered from the signal.

18. The method of claim 10, further comprising the steps of:
   the externally powered meter interface units gathering the meter status information in response to message reception; and
   the externally powered meter interface units transmitting the meter status information to the meter reading device at the first data rate.

19. The method of claim 18, wherein the step of transmitting the meter status information comprises, in the externally powered meter interface units, the step of:
   transmitting the meter status information to the meter reading device at the first data rate only when there is no channel activity at the first data rate.

20. The method of claim 10, further comprising the steps of:
   the battery powered meter interface units gathering the meter status information in response to message reception; and
   the battery powered meter interface units transmitting the meter status information to the meter reading device at the second data rate.

21. The method of claim 20, wherein the step of transmitting the meter status information comprises, in the battery powered meter interface units, the step of:
   transmitting the meter status information to the meter reading device at the second data rate only when there is no channel activity at the second data rate.

* * * * *